US012392044B2

United States Patent
Ben Salah et al.

(10) Patent No.: US 12,392,044 B2
(45) Date of Patent: Aug. 19, 2025

(54) PROCESS AND APPARATUS FOR THE ELECTRO-CHEMICAL TREATMENT OF WATER CONTAMINATED WITH EMERGING CONTAMINANTS

(71) Applicant: E2METRIX CANADA INC., Sherbrooke (CA)

(72) Inventors: Ihsen Ben Salah, Sherbrooke (CA); Mohamed Laaroussi, Sherbrooke (CA)

(73) Assignee: E2METRIX CANADA INC., Sherbrooke (CA)

( * ) Notice: Subject to any disclaimer, the term of this patent is extended or adjusted under 35 U.S.C. 154(b) by 540 days.

(21) Appl. No.: 17/708,097

(22) Filed: Mar. 30, 2022

(65) Prior Publication Data
US 2022/0220012 A1   Jul. 14, 2022

Related U.S. Application Data

(63) Continuation of application No. PCT/CA2021/050083, filed on Jan. 27, 2021.
(Continued)

(51) Int. Cl.
*C25B 9/65* (2021.01)
*C02F 1/28* (2023.01)
(Continued)

(52) U.S. Cl.
CPC ............... *C25B 9/65* (2021.01); *C02F 1/283* (2013.01); *C02F 1/442* (2013.01);
(Continued)

(58) Field of Classification Search
CPC ...... C02F 1/467; C02F 1/4672; C02F 1/4674; C02F 2001/46171; C02F 2101/305; C02F 2101/36; C02F 2305/023
(Continued)

(56) References Cited

U.S. PATENT DOCUMENTS 8,460,520 B2 *  6/2013  Rigby ................... C02F 1/4602
                                                       205/687
9,957,172 B2    5/2018  Niu et al.
(Continued)

FOREIGN PATENT DOCUMENTS

CN    105540756 A    5/2016
WO    2016091159 A1  6/2016

OTHER PUBLICATIONS

Bagastyo et al. "Electrochemical oxidation of reverse osmosis concentrate on boron-doped diamond anodes at circumneutral and acidic pH" Water Research 46 (2012) 6104-6112 (Year: 2012).*
(Continued)

*Primary Examiner* — Luan V Van
*Assistant Examiner* — Alexander R. Parent
(74) *Attorney, Agent, or Firm* — Damien Calvet; Gowling WLG (Canada) LLP

(57) ABSTRACT

An electrolytic reactor and process for decontaminating wastewater containing emerging contaminants, such as medicament residues or per- and polyfluoroalkyl substances (PFAS) are disclosed. The contaminated wastewater is circulated through one or several reactors for electro-oxidizing and degrading the contaminants. Each reactor comprises an enclosure, an electrode assembly comprising first and second current distribution circuits, a first group of N electrodes connected to the first current distribution circuit, and a second group of N electrodes connected to the second current distribution circuit. According to the polarity of the current provided to the electrodes, the electrodes of the first group form anodes whereas the electrodes of the second group forms cathodes, and vice versa. The electrodes are preferably dimensionally stable anodes (DSA). The reactor and process described herein allow removal of multiple
(Continued)

emerging contaminants simultaneously, in addition to reducing the carbon footprint through lower power consumption.

14 Claims, 8 Drawing Sheets

Related U.S. Application Data

(60) Provisional application No. 62/966,756, filed on Jan. 28, 2020.

(51) Int. Cl.
    | | | |
    |---|---|---|
    | C02F 1/44 | (2023.01) |
    | C02F 1/461 | (2023.01) |
    | C02F 1/467 | (2023.01) |
    | C02F 1/66 | (2023.01) |
    | C02F 1/78 | (2023.01) |
    | C02F 101/30 | (2006.01) |
    | C02F 101/36 | (2006.01) |
    | C02F 103/06 | (2006.01) |
    | C25B 9/63 | (2021.01) |

(52) U.S. Cl.
    CPC ........ *C02F 1/46109* (2013.01); *C02F 1/4672* (2013.01); *C02F 1/66* (2013.01); *C02F 1/78* (2013.01); *C25B 9/63* (2021.01); *C02F 2001/46142* (2013.01); *C02F 2001/46171* (2013.01); *C02F 2101/305* (2013.01); *C02F 2101/36* (2013.01); *C02F 2103/06* (2013.01); *C02F 2201/4614* (2013.01); *C02F 2201/46145* (2013.01); *C02F 2209/05* (2013.01); *C02F 2209/06* (2013.01); *C02F 2301/08* (2013.01); *C02F 2305/023* (2013.01)

(58) Field of Classification Search
    USPC .................................. 205/752, 756, 759, 760
    See application file for complete search history.

(56) References Cited

U.S. PATENT DOCUMENTS

| | | | | |
|---|---|---|---|---|
| 2014/0027271 | A1* | 1/2014 | Berrak | C02F 1/46109 |
| | | | | 204/225 |
| 2015/0166383 | A1 | 6/2015 | Visnja et al. | |
| 2018/0222781 | A1* | 8/2018 | Liu | C02F 1/722 |
| 2018/0319680 | A1* | 11/2018 | Ben Salah | C02F 1/467 |
| 2019/0185351 | A1 | 6/2019 | Huang et al. | |
| 2019/0284073 | A1 | 9/2019 | Yost et al. | |
| 2020/0399147 | A1* | 12/2020 | Yost | C02F 1/4672 |

OTHER PUBLICATIONS

Gomez-Ruiz et al. "Efficient electrochemical degradation of poly- and perfluoroalkyl substances (PFASs) from the effluents of an industrial wastewater treatment plant" Chemical Engineering Journal 322 (2017) 196-204 (Year: 2017).*
International Search Report from the corresponding PCT/CA2021/050083 dated Apr. 16, 2021.
Rahman et al., "Behaviour and fate of perfluoroalkyl and polyfluoroalkyl substances (PFASs) in drinking water treatment: a review", Water Res., Mar. 1, 2014; 50: 318-40.
"Drinking Water Health Advisory for Perfluorooctanoic Acid (PFOA)", EPA 822-R-16-005, U.S. Environmental Protection Agency, Washington, DC; https://www.epa.gov/sites/default/files/2016-05/documents/pfoa_health_advisory_final_508.pdf.
"Drinking Water Health Advisory for Perfluorooctane Sulfonate (PFOS)", EPA 822-R-16-002. U.S. Environmental Protection Agency, Washington, DC; https://www.epa.gov/sites/default/files/2016-05/documents/pfos_health_advisory_final_508.pdf.
Agency for Toxic Substances and Disease Registry (ATSDR). 2021. Toxicological profile for Perfluoroalkyls. Atlanta, GA: U.S. Department of Health and Human Services, Public Health Service. https://wwwn.cdc.gov/TSP/ToxProfiles/ToxProfiles.aspx?id=1117&tid=237.
United States Environmental Protection Agency (USEPA), 2009, "Long-Chain Perfluorinated Chemicals (PFCs) Action Plan"): https://www.epa.gov/sites/default/files/2016-01/documents/pfcs_action_plan1230_09.pdf.
United States Environmental Protection Agency (USEPA) 2019, Report EPA 823R18004: https://www.epa.gov/sites/default/files/2019-02/documents/pfas_action_plan_021319_508compliant_1.pdf.

* cited by examiner

PROCESS AND APPARATUS FOR THE ELECTRO-CHEMICAL TREATMENT OF WATER CONTAMINATED WITH EMERGING CONTAMINANTS

CROSS-REFERENCE TO RELATED APPLICATIONS

The present patent application is a continuation of the international application No. PCT/CA2021/050083 filed on Jan. 27, 2021, that claims the benefits of priority of U.S. Provisional Patent Application No. 62/966,756 entitled "Process and apparatus for the electro-chemical treatment of water contaminated with Per- and polyfluoroalkyl substances (PFAS)", and filed at the United States Patent and Trademark Office on Jan. 28, 2020, the content of which is incorporated herein by reference.

FIELD OF THE INVENTION

The present invention generally relates to a process and an apparatus for treating and decontaminating water, more particularly by the electro-chemical treatment of water contaminated with emerging contaminants, such as but not limited to perfluoroalkyl and polyfluoroalkyl substances (PFAS) or medicament residues.

BACKGROUND OF THE INVENTION

Emerging contaminants, or contaminants of emerging concern, can refer to many different kinds of chemicals, including medicines, personal care or household cleaning products, lawn care and agricultural products, among others. These chemicals make it into rivers, lakes and oceans and have a detrimental effect on fish and other aquatic species. That have also been shown to bioaccumulate up the food web, putting even non-aquatic species at risk when they eat contaminated fish.

Among the known emerging contaminants, per- and polyfluoroalkyl substances (PFAS), also referred to as perfluorinated chemicals (PFCs), are a large group of environmentally persistent, man-made chemicals used in industrial and commercial household uses. Currently, there are over 600 PFAS's compounds that the Environmental Protection Agency (EPA) has approved for sale or import into the United States. Due to their widespread use, PFAS are being found at low ambient levels in the environment. Large amounts of the PFAS manufactured in the past have found their way into the air, soil and water. Recent reports indicate that the amounts of PFAS from landfill leachate may outstrip the amounts from currently identified PFAS contaminated sites. This will generate a growing need for new PFAS treatment technology beyond the capability of activated carbon or membrane technology.

Two PFAS that are most often found in drinking water are legacy compounds that are no longer manufactured but are still being found in the environment, including perfluorooctanoic acid (PFOA) and perfluorooctanesulfonic acid (PFOS) (American Water Works Association (www.awwa.org). In addition, many PFAS are chemically and thermally stable, and demonstrate resistance to heat, water, and oil (Rahman et al., "*Behaviour and fate of perfluoroalkyl and polyfluoroalkyl substances (PFASs) in drinking water treatment: a review*", Water Res., Mar. 1, 2014; 50:318-40). Due to their desirable chemical properties for consumer goods, PFAS are widely used in commercial products and can be found in almost every U.S. home and business (Rahman et al., 2014, cited supra). Furthermore, due to their widespread use and persistence in the environment, most people in the United States have been exposed to PFAS. There is evidence that continued exposure to certain PFAS above specific levels may lead to adverse health effects ("*Drinking Water Health Advisory for Perfluorooctanoic Acid (PFOA)*", EPA 822-R-16-005, U.S. Environmental Protection Agency, Washington, DC; "*Drinking Water Health Advisory for Perfluorooctane Sulfonate (PFOS)*", EPA 822-R-16-002. U.S. Environmental Protection Agency, Washington, DC, ATSDR (Agency for Toxic Substances and Disease Registry), 2018a, "Toxicological Profile for Perfluoroalkyls"). Consumption has been tied to serious adverse health consequences. Very low doses of PFAS chemicals in drinking water have been linked to an increased risk of cancer, reproductive and immune system harm, liver and thyroid disease, and other health problems.

Detection in many water sources have shown that PFAS exceeded 1 part per trillion, or ppt, the recommended safe level. More than 40 percent of the systems reviewed had at least one sample with a level of total PFAS over 70 ppt, the EPA's inadequate lifetime health advisory level for the two most notorious fluorinated chemicals: PFOA and PFOS. As of now, the EPA only enforces a 70-ppt voluntary recommendation for PFAS levels in drinking water.

Current approaches for removal of PFAS from water to acceptable levels center around three main traditional, decades old technologies: adsorption to activated carbon, ion exchange, and reverse osmosis. While all three of these technologies can be highly effective, they do not result in the direct destruction of PFAS compounds. Although the near-term treatment costs may be low, the long-term cost can become quite high due to solid and liquid disposal costs as well as site management. It is important for concerned parties to address five key issues prior to selecting any treatment system for PFAS (United States Environmental Protection Agency (USEPA), 2009, "Long-Chain Perfluorinated Chemicals (PFCs) Action Plan"):

1) Capital and operating costs (affordability);
2) Staff can handle operational scheme over the long term;
3) Technology can operate long term under a reasonable maintenance program;
4) Technology and treatment train can handle source water quality changes; and
5) Any waste stream generated can be treated or disposed in a sustainable and cost-effective manner over the long term.

The carbon-fluorine bond in PFAS chemical structures is one of the strongest bonds known in chemistry. This results in an extremely difficult challenge for the remediation of the PFAS contaminants in waste waters. Traditional technologies have been shown by the EPA to be ineffective treatments (United States Environmental Protection Agency (USEPA) 2019, Report EPA 823R18004 Effective treatments of PFAS contaminated waters typically imply mass transfer (e.g., granular activated carbon, ion exchange resin) or membrane (e.g. reverse osmosis) technologies. However, these treatments are too expensive to scale-up and provide treatments for a large amount of wastewater or for high concentrations.

Other known treatments imply concentrating PFAS onto an adsorptive media (i.e. creating spent media) or creating highly toxic reject water. Additional remediation costs are then incurred when the user is required to send the liquid concentrate for off-site incineration or activated carbon for regeneration (which is never quite as effective as virgin activated carbon) for reuse. All these steps require management and costs, as well as a chain of custody of the toxic material.

There is thus a need for an improved process and apparatus for decontaminating water contaminated with emerging contaminants, such as PFAS.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect, the invention is directed to an apparatus, an electrolytic reactor, for treating wastewater. The reactor comprises a vertical tubular enclosure defining a bottom end and a top end and a peripheral wall extending from the bottom to the top end. The reactor further comprises an electrode assembly comprising a first and second current distribution circuit, a first group of N electrodes operatively connected to the first current distribution circuit, and a second group of N electrodes operatively connected to the second current distribution circuit. The 2N electrodes extend from the top end of the enclosure inside the enclosure, and the first group of N electrodes alternate with the second group of N electrodes along and adjacent the peripheral wall of the enclosure. An electric power supply is also provided with the reactor to provide a current to the first and second current distribution circuit, the electrodes of the first group forming anodes and the electrodes of the second group forming cathodes, and vice versa, according to the polarity of the current provided to the first and second group of electrodes. The reactor also comprises a pump operatively connected to the enclosure for circulating the wastewater from the bottom end to the top end of the enclosure of the reactor.

According to a second aspect, the invention is directed to a process for decontaminating water contaminated with per- and polyfluoroalkyl substances (PFAS). The process comprises: circulating the contaminated water through a reactor for electro-oxidizing and degrading the PFAS.

According to a third aspect, the invention is directed to the use of the electro-oxidizing reactor as defined herein, for electro-oxidizing and degrading PFAS contained in water contaminated with said PFAS.

According to a further aspect, the invention is directed to an electrolytic reactor for treating wastewater, comprising an enclosure comprising: a closed end having an inlet, an open end, opposite to the closed end, forming an aperture and having at least one outlet adjacent the aperture, and a peripheral wall extending from the closed end to the open end. The electrolytic reactor also comprises an electrode assembly configured to be inserted into the enclosure through the aperture and to seal the aperture to form the electrolytic reactor. The electrode assembly comprises a first group of N electrodes operatively connected to a first current distribution circuit; and a second group of N electrodes operatively connected to a second current distribution circuit. In the electrolytic reactor: N is an integer greater than or equal to 3; the 2N electrodes of the first and second groups are configured to extend from the open end towards the closed end of the enclosure inside the enclosure; the first and second current distribution circuits are each configured to be operatively connected to an electric power supply, the N electrodes of the first group forming anodes and the N electrodes of the second group forming cathodes, and vice versa, according to a polarity of the current provided to the first and second groups of electrodes; and the inlet is configured to be fluidly connected to a pump for circulating the wastewater inside the enclosure from the inlet to the at least one outlet of the reactor.

According to a preferred embodiment, the 2N electrodes are 2N longitudinal rods disposed in a cylindrical manner along the peripheral wall, the N electrodes of the first group alternating with the N electrodes of the second group. Preferably, the longitudinal rods comprise a core made of titanium covered by a conductive layer of iridium dioxide. Alternatively, electrodes comprising Platinum can be used.

According to a preferred embodiment, the electrode assembly comprises a crown member configured to hold the 2N electrodes and secure the current distribution circuits, the crown member being configured to seal the aperture of the enclosure once the electrodes are inserted into the enclosure. Preferably, the crown member comprises: a plate for supporting the electrodes extending therefrom, the plate at least matching in size with the open end of the enclosure to seal the enclosure; and a tubular insert extending from the plate in an opposite direction than the electrodes, the tubular insert and the plate forming an inner space for securing the current distribution circuits.

According to a preferred embodiment, each of the two current distribution circuits comprises: electrical wires located inside the tubular insert for connecting in series the one electrode to the next electrode of its respective group; and one main distribution wire for connecting the electrical wires to the power supply, the one main distribution wire passing through a peripheral wall of the tubular insert for connecting to the power supply.

According to another preferred embodiment, the first current distribution circuit comprises a first distribution plate made of an electrical conductive material and defining a first shape, and the second current distribution circuit comprises a second distribution plate made of the electrical conductive material and defining a second shape, wherein each plate is configured to connect in parallel the N electrodes of its respective group, and wherein the first and second shapes allow the distributions plates to be inserted into the inner space of the tubular enclosure while keeping a gap therebetween to avoid electrical contact. More preferably, the first plate has a ring shape extending along a peripheral wall of the tubular insert whereas the second plate has a star shape configured in size to be located inside the first plate. More preferably, the first ring shaped plate forms a number N of tips extending inwardly, N being the integer as defined herein, each tip forming an electrical connecting point with one electrode of the same group, whereas the second star shaped plate has a number N of tips extending outwardly toward the first plate, each tip of the second plate forming another electrical connecting point with one electrode of the other group, wherein the N tips of the second plate intercalate with the N tips of the first plate along a same circumferential position, the intercalated tips being then each electrically connected with one electrode of its respective group.

According to a preferred embodiment, the 2N electrodes of the reactor are dimensionally stable electrodes.

According to a preferred embodiment, the number N of electrodes is 6, 9, 12, 16 or 18.

According to a preferred embodiment, the reactor further comprises a control module for modulating a flow rate of the wastewater circulating in the reactor and/or controlling a retention time of the wastewater inside the enclosure. Preferably, the control module comprises a modulating valve operatively connected to a control panel for modulating the flow rate and/or retention time.

According to a preferred embodiment, wherein the enclosure defines: an electrolysation chamber extending from the open end of the enclosure and configured for containing the electrodes; and a flow dispersion chamber located below the electrolysation chamber adjacent the closed end for receiving the wastewater from the inlet connected to the pump.

According to a preferred embodiment, the reactor further comprises a temperature control unit for controlling a temperature inside the electrolytic reactor.

According to a preferred embodiment, the reactor as disclosed herein is for use in the treatment of wastewater comprising emerging contaminants. Preferably, the emerging contaminants comprises chemical residue of medicaments and/or perfluoroalkyl and polyfluoroalkyl substances (PFAS).

According to another aspect, the invention is directed to a reactor assembly for the treatment of wastewater. The reactor assembly comprises at least one electrolytic reactor as defined herein; an electrical power supply operatively connected to the current distribution circuits of each of the at least one reactor; and a pump fluidly connected to the inlet of the at least one electrolytic reactor for circulating the wastewater inside the reactor assembly.

According to a preferred embodiment, the reactor assembly further comprises a filtering module fluidly connected to the outlet of the at least one electrolytic reactor for filtering the wastewater once treated in the at least one electrolytic reactor. Preferably, the filtering module comprises a filter comprising activated carbon as filtering agent, more preferably granulated activated carbon.

According to a preferred embodiment, the reactor assembly comprises two or more of the at least one electrolytic reactor fluidly connected in series, the inlet of a first reactor being fluidly connected to the pump, and the outlet of a last reactor being fluidly connected to the filtering module.

According to a preferred embodiment, the reactor assembly further comprises a control module for modulating a flow rate of the wastewater circulating in the at least one reactor and/or for controlling a retention time of the wastewater inside the enclosure. Preferably, the control module comprises a modulating valve operatively connected to a control panel for modulating the flow rate and/or retention time.

According to a preferred embodiment, the control panel of the reactor assembly is also operatively connected to the electric power supply for controlling the current density.

According to another aspect, the invention is directed to a process for decontaminating water contaminated with emerging contaminants, comprising: circulating the contaminated wastewater through the electrolytic reactor as defined herein, or through the reactor assembly as defined herein, while applying a current to the electrodes, for electro-oxidizing and degrading said emerging contaminants. Preferably, the emerging contaminants comprises chemical residue of medicaments and/or perfluoroalkyl and polyfluoroalkyl substances (PFAS).

According to yet another aspect, the invention is directed to a process for decontaminating water contaminated with emerging contaminants comprising chemical residues of medicaments, perfluoroalkyl and polyfluoroalkyl substances (PFAS) or mixtures thereof. The process comprises: circulating the contaminated wastewater through at least one electrolytic reactor comprising electrodes, while applying a current to the electrodes, for electro-oxidizing and degrading said emerging contaminants. Preferably, the electrodes are dimensionally stable electrodes. Preferably, the electrodes of each reactor comprise a first group of N electrodes operatively connected to a first current distribution circuit and a second group of N electrodes operatively connected to a second current distribution circuit; wherein N is an integer greater than or equal to 3, and wherein the first and second current distribution circuits are each configured to be operatively connected to an electric power supply, the N electrodes of the first group forming anodes and the N electrodes of the second group forming cathodes, and vice versa, according to a polarity of the current provided to the first and second groups of electrodes. More preferably, the 2N electrodes are 2N longitudinal rods disposed in a cylindrical manner along an inner peripheral wall of each of the at least one reactor, the N electrodes of the first group alternating with the N electrodes of the second group. The longitudinal rods preferably comprise a core made of titanium covered by a conductive layer of iridium dioxide; or platinum. More preferably, N is 6, 9, 12, 16 or 18. According to a preferred embodiment, in the process as defined herein above, the first current distribution circuit comprises a first distribution plate made of an electrically conductive material and defining a first shape, and the second current distribution circuit comprises a second distribution plate made of the electrically conductive material and defining a second shape. Each plate is configured to connect in parallel the N electrodes of its respective group. The first and second shapes allow the distributions plates to be inserted into the inner space of the tubular enclosure while keeping a gap therebetween to avoid electrical contact.

According to a preferred embodiment, in the process as defined herein above, the first plate has a ring shape extending along a peripheral wall of the tubular insert, and the second plate has a star shape configured in size to be located inside the first plate, the first ring shaped plate forms a number N of tips extending inwardly, N being as defined herein. Each tip forms an electrical connecting point with one electrode of the same group. The second star shaped plate has a number N of tips extending outwardly toward the first plate. The N tips of the second plate intercalate with the N tips of the first plate along a same circumferential position, the intercalated tips being then each electrically connected with one electrode of its respective group.

According to a preferred embodiment, the process as defined herein further comprises the step of: modulating a flow rate of the wastewater circulating in the reactor and/or controlling a retention time of the wastewater inside the reactor.

According to a preferred embodiment, the current provides a current density to the electrodes from about 10 mA/cm$^2$ to about 50 mA/cm$^2$, more preferably of about 30 mA/cm$^2$.

According to a preferred embodiment, the process as disclosed herein further comprises: filtrating the wastewater exiting the reactor for removing emerging contaminants degraded in the reactor(s). Preferably, filtrating the water is performed using a filter comprising activated carbon, more preferably granulated activated carbon.

According to a preferred embodiment, the process as disclosed herein further comprises: pre-oxidizing the wastewater with ozone before circulating the wastewater in the reactor(s).

According to a preferred embodiment, the process as disclosed herein further comprises: passing the wastewater through a membrane before circulating the wastewater in the reactor(s) for concentrating the contaminated wastewater.

According to a preferred embodiment, the process further as disclosed herein comprises: adding a given amount of a salt to the wastewater to increase the conductivity of the wastewater circulating in the reactor(s). Preferably, the salt comprises sodium persulfate ($Na_2S_2O_8$).

According to a preferred embodiment, the process as disclosed herein further comprises: adding a given amount of a base to the wastewater to increase the pH of the wastewater circulating in the reactor(s). Preferably, the base comprises sodium hydroxide (NaOH).

The present invention is also directed to the use of the electrolytic reactor as defined herein, or the reactor assembly as defined herein, for treating wastewater contaminated with emerging contaminants. The present invention is also directed to the use of an electrolytic reactor comprising dimensionally stable electrodes for treating wastewater contaminated with emerging contaminants by electro-oxidizing and degrading said emerging contaminants. Preferably, the emerging contaminants comprise chemical residues of medicaments, perfluoroalkyl and polyfluoroalkyl substances (PFAS) or mixtures thereof.

The reactor and process described herein allow efficient removal of multiple contaminants simultaneously, in addition to reducing the carbon footprint through lower power consumption compared to previous reactors and processes.

Other and further aspects and advantages of the present invention will be better understood upon the reading of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings, in which.

DETAILED DESCRIPTION OF THE PREFERRED EMBODIMENT

Figure 1:
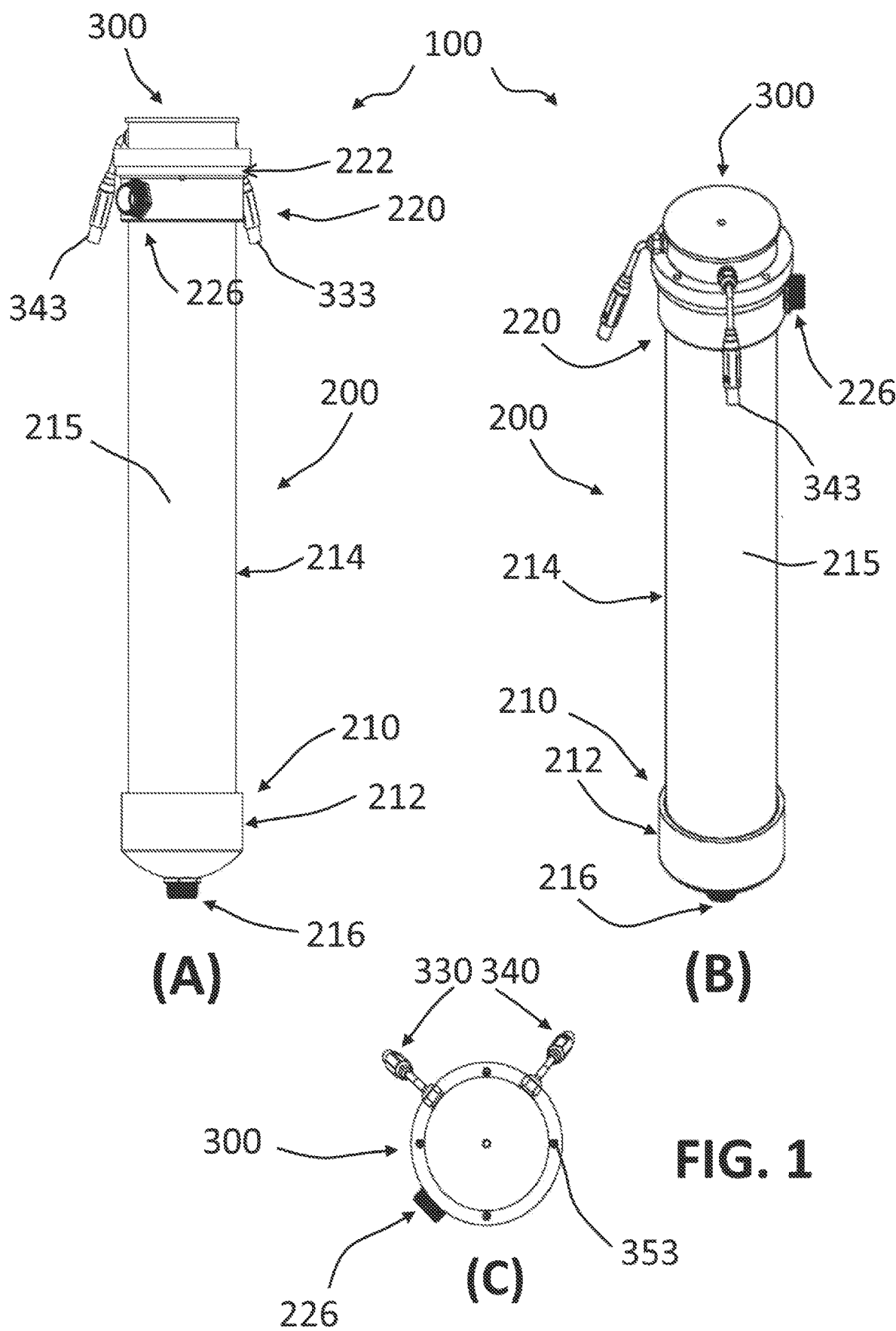
FIG. 1 illustrates a reactor according to a first preferred embodiment with (A) is a front plan view, (B) is a isometric view, and (C) is a top view.

A novel reactor and process for decontaminating water will be described hereinafter. Although the invention is described in terms of specific illustrative embodiments, it is to be understood that the embodiments described herein are by way of example only and that the scope of the invention is not intended to be limited thereby.

The terminology used herein is in accordance with definitions set out below.

As used herein % or wt. % means weight % unless otherwise indicated. When used herein % refers to weight % as compared to the total weight percent of the phase or composition that is being discussed.

By "about", it is meant that the value of weight, time, pH, volume, amperage or temperature can vary within a certain range depending on the margin of error of the method or device used to evaluate or measure such weight, time, pH, volume, amperage or temperature. A margin of error of 10% is generally accepted.

By "current density", it is meant the electric current divided by the active area of the anodes.

Table 1 below gives the most common acronyms used for identifying PFAS.

TABLE 1

| PFAS names and acronyms | |
|---|---|
| Acronym | PFAS names |
| PFOA | Perfluorooctanoic acid |
| PFOS | Perfluorooctane sulfonate |
| PFBA | Perfluorobutanoic acid |
| PFBS | Perfluorobutane sulfonate |
| PFHxS | Perfluorohexane sulfonate |
| PFPeA | Perfluoropentanoic acid |
| PFHxA | Perfluorohexanoic acid |
| PFHpA | Perfluoroheptanoic acid |
| PFNA | Perfluorononanoic acid |

The description which follows, and the embodiments described therein are provided by way of illustration of an example of particular embodiments of principles and aspects of the present invention. These examples are provided for the purposes of explanation and not of limitation, of those principles of the invention. In the description that follows, like parts and/or steps are marked throughout the specification and the drawing with the same respective reference numerals.

Reactors:

As aforesaid, the invention is first directed to an electrolytic reactor for treating wastewater. Two different embodiments are illustrated on FIGS. 1 and 2, and FIGS. 3 and 4, respectively.

Figure 3:
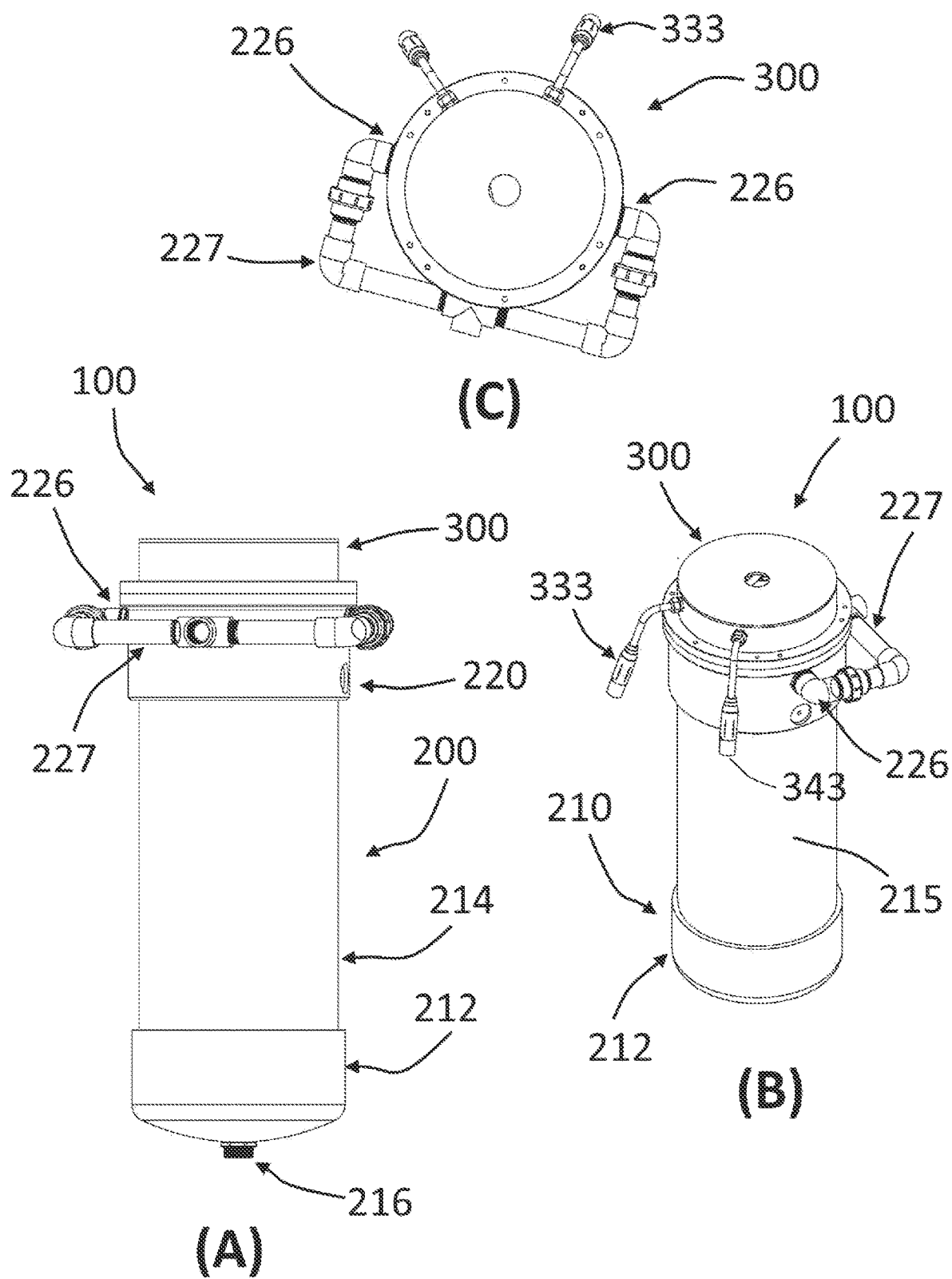
FIG. 3 illustrates a reactor according to a second preferred embodiment with (A) is a front plan view, (B) is a isometric view, and (C) is a top view.

FIGS. 1 and 3 illustrate a first and second preferred embodiments of an electrolytic reactor for treating wastewater with different treatment capacity.

The electrolytic reactor (100), or merely "reactor" hereinafter comprises an enclosure (200). Preferably, the enclosure is a vertical tubular chamber, but other geometry or orientation of the enclosure could be considered without departing from the scope of the present invention. The enclosure (200) comprises a closed end (210). As illustrated, the closed end (210) may be formed by a cap (212) in which a tube (214) forming the reactor's chamber is inserted and sealed. It is understood that the cap can be removed for maintenance and cleaning the reactor. A sealing material (not shown), such as a rubber ring or Teflon®, can be inserted between the cap (212) and the tube (214) for a better sealing of the reactor. Other configuration of the closed end can be considered without departing from the scope of the present invention.

The closed end (210) has an inlet (216), preferably extending vertically or parallel the longitudinal direction of the tube (214). Other orientations of the inlet, such as the inlet being perpendicular to the longitudinal direction of the tube, can be considered without departing from the scope of the present invention. The inlet (216) is configured to be fluidly connected to a pipe system with a pump (120) for injecting and circulating the wastewater in the reactor (see FIG. 5 or 6).

The enclosure (200) comprises an open end (220), opposite to the closed end (210), forming an aperture (not visible). As illustrated on FIG. 1, the reactor (100) may have one outlet (226) adjacent the aperture or open end (210). As illustrated on FIG. 3, the reactor (100) may have two outlets (226) adjacent the aperture or open end (210). The outlets (226) are configured to be fluidly connected to another pipe system (227) for flowing the wastewater out of the reactor.

According to a preferred embodiment, the tube (214) forming the reactor's chamber has a peripheral wall (215) extending from the closed end (210) to the open end (220).

Figure 2:
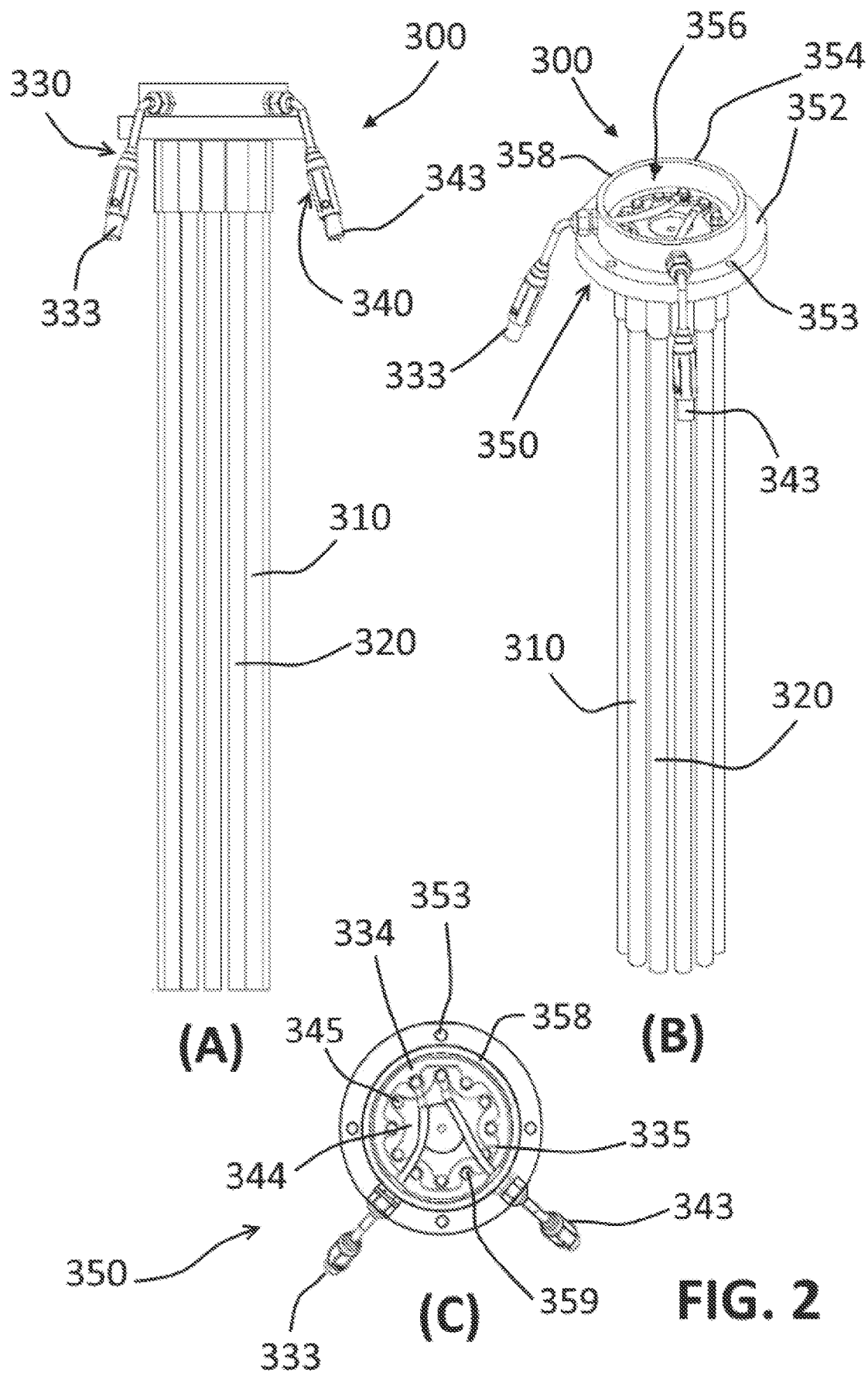
FIG. 2 illustrates the electrode assembly of the reactor according to the first preferred embodiment illustrated on FIG. 1 with 2N electrodes (N=6), with (A) is a front plan view, (B) is an isometric view, and (C) is a top view.
Figure 4:
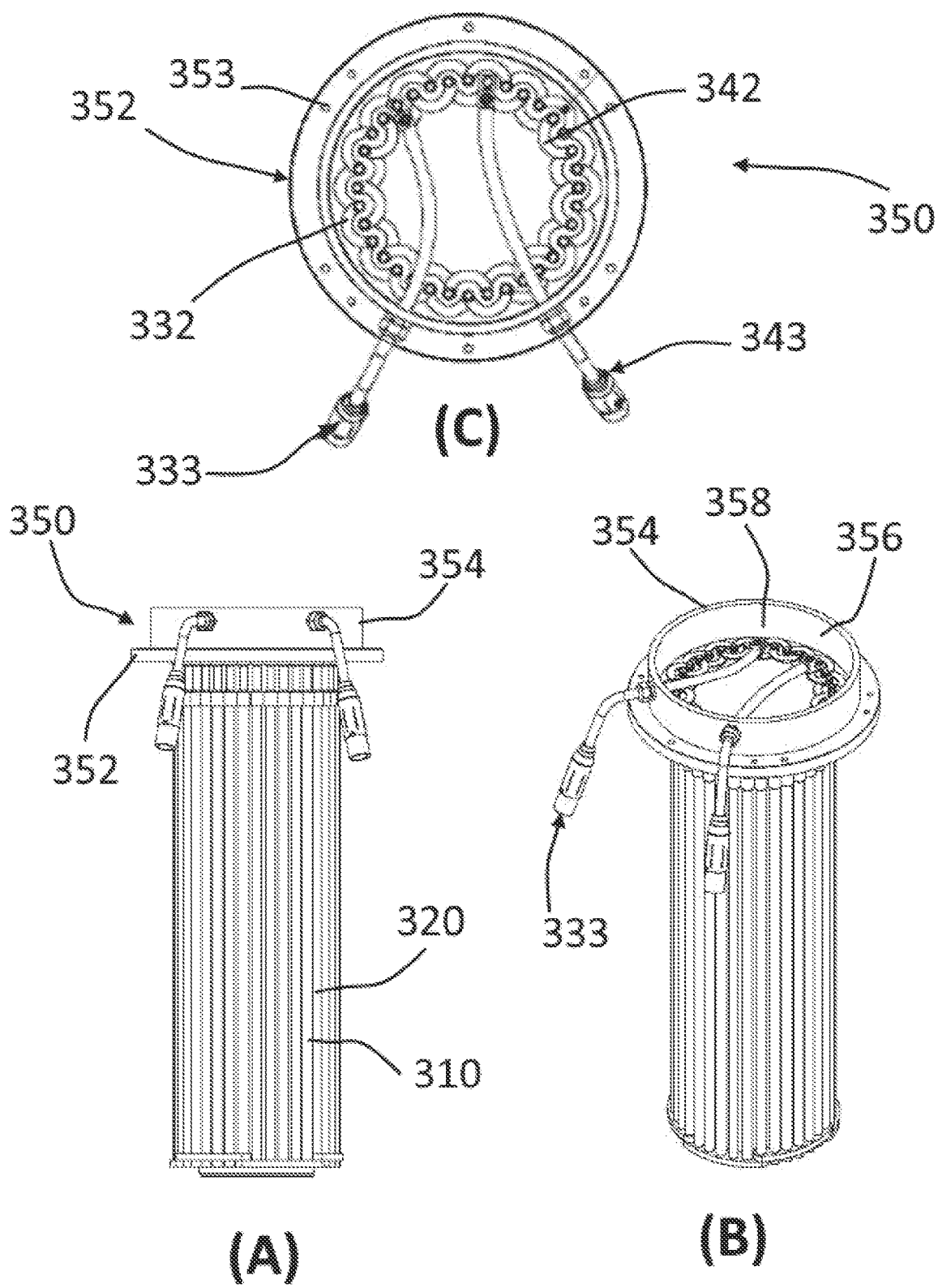
FIG. 4 illustrates the electrode assembly of the reactor according to the second preferred embodiment illustrated on FIG. 3 with 2N electrodes (N=18), wherein (A) is a front plan view, (B) is an isometric view, and (C) is a top view.

According to a preferred embodiment, such as the one illustrated on FIG. 2 or 4, the reactor (100) comprises an electrode assembly (300) configured to be inserted into the enclosure (200) through the aperture and to seal the aperture forming as such the electrolytic reactor (100).

The electrode assembly (300) comprises a first group of N electrodes (310) operatively connected to a first current distribution circuit (330); and a second group of N electrodes (320) operatively connected to a second current distribution circuit (340). N is an integer greater than or equal to 3. In FIG. 2, N=6 whereas in Figure N=18. N is 6, 9, 12, 16 or 18. The number N of electrodes depends on the treatment capacity sought for the reactor.

Preferably, the 2N electrodes of the first and second groups (310, 320) are configured to extend from the open end (220) towards the closed end of the enclosure once the electrode assembly (300) is inserted inside the enclosure (200). The first and second current distribution circuits (330, 340) are each configured to be operatively connected to an electric power supply (360) (see FIG. 5 or 6), the N electrodes of the first group forming anodes and the N electrodes of the second group forming cathodes, and vice versa, according to the polarity of the current provided to the first and second groups of electrodes.

According to the preferred embodiments illustrated on FIG. 2 or 4, the 2N electrodes of the electrodes' assembly (300) are longitudinal rods (310, 320) disposed in a cylindrical manner along the peripheral wall (215), the N electrodes of the first group (310) alternating with the N electrodes of the second group (320). More preferably, the rods are made from an inert or non-consumable material, forming as such dimensionally stable electrodes (e.g. DSA=dimensionally stable anodes).

According to a preferred embodiment, the electrode assembly (300) comprises a crown member (350) configured to hold the 2N electrodes and secure the current distribution circuits as detailed hereinafter. The crown member (350) is configured to seal the aperture of the enclosure (200) once the electrodes are inserted into the enclosure. Preferably, the crown member (350) comprises a plate (352) for supporting the electrodes extending therefrom, the plate preferably matching in size with the peripheral edge (222) the open end (220) of the enclosure (200) to seal the enclosure when the electrodes' assembly is inserted in the enclosure. The plate (352) of the electrodes' assembly may comprises a plurality of orifices (353) aligning and matching with orifices located along the peripheral edge (222) of the open end (220) of the enclosure (200). The reactor can be sealed using bolted screws inserted in the orifices. A sealing material (not shown), such as a rubber ring, can be inserted between the plate (352) and the edge (222) for a better sealing of the reactor.

The crown member (350) may further comprise a tubular insert (354) extending from the plate (352) in an opposite direction than the electrodes (310, 320), the tubular insert and the plate forming an inner space (356) for securing the current distribution circuits.

According to a preferred embodiment illustrated on FIG. 4 (B and C), the reactor (100) comprises 36 rod electrodes (i.e. N=18). Due to this quite large number of electrodes, each of the two current distribution circuits (330, 340) comprises a plurality of electrical wires (332, 342), located inside the inner space (356) of the tubular insert, for connecting one electrode to the next electrode of its respective group. The current distribution circuits (330, 340) also comprise each one main distribution wire (333, 343) for connecting the electrical wires to the power supply. The one main distribution wire is configured to pass through a peripheral wall (358) of the tubular insert (354) for connecting to the power supply.

According to another preferred embodiment illustrated on FIG. 2 (B and C), the reactor (100) comprises 12 rod electrodes (i.e. N=6). Due to a smaller number of electrodes, the first current distribution circuit (330) comprises a first distribution plate (334) made of an electrically conductive material and defining a first shape, whereas the second current distribution circuit comprises a second distribution plate (344), also made of the electrically conductive material, and defining a second shape. Each of the distribution plates (334, 344) are configured to connect in parallel the N electrodes of its respective group. The first and second shapes allow the distributions plates to be inserted into the inner space (356) of the tubular insert (354) while keeping a gap (335) therebetween to avoid electrical contact.

As detailed in FIG. 2-C, the first plate (334) has a ring shape extending along the peripheral wall (358) of the tubular insert (354). The ring forms a number N of tips (359) extending inwardly, each tip forming an electrical connecting point with an electrode of the same group. In order to match with the first plate, the second plate (344) is configured to be inserted inside the ring of the first plate (334) without touching the first plate to keep the gap (335). The second plate (344) has a "star shape" with a number N of tips (345) extending outwardly toward the ring (334) in a way that the tips of the second plate intercalate with the tips of the first plate along the same circumferential position. The intercalated tips (345, 359) are each connecting with one electrode of its respective group.

Figure 5:
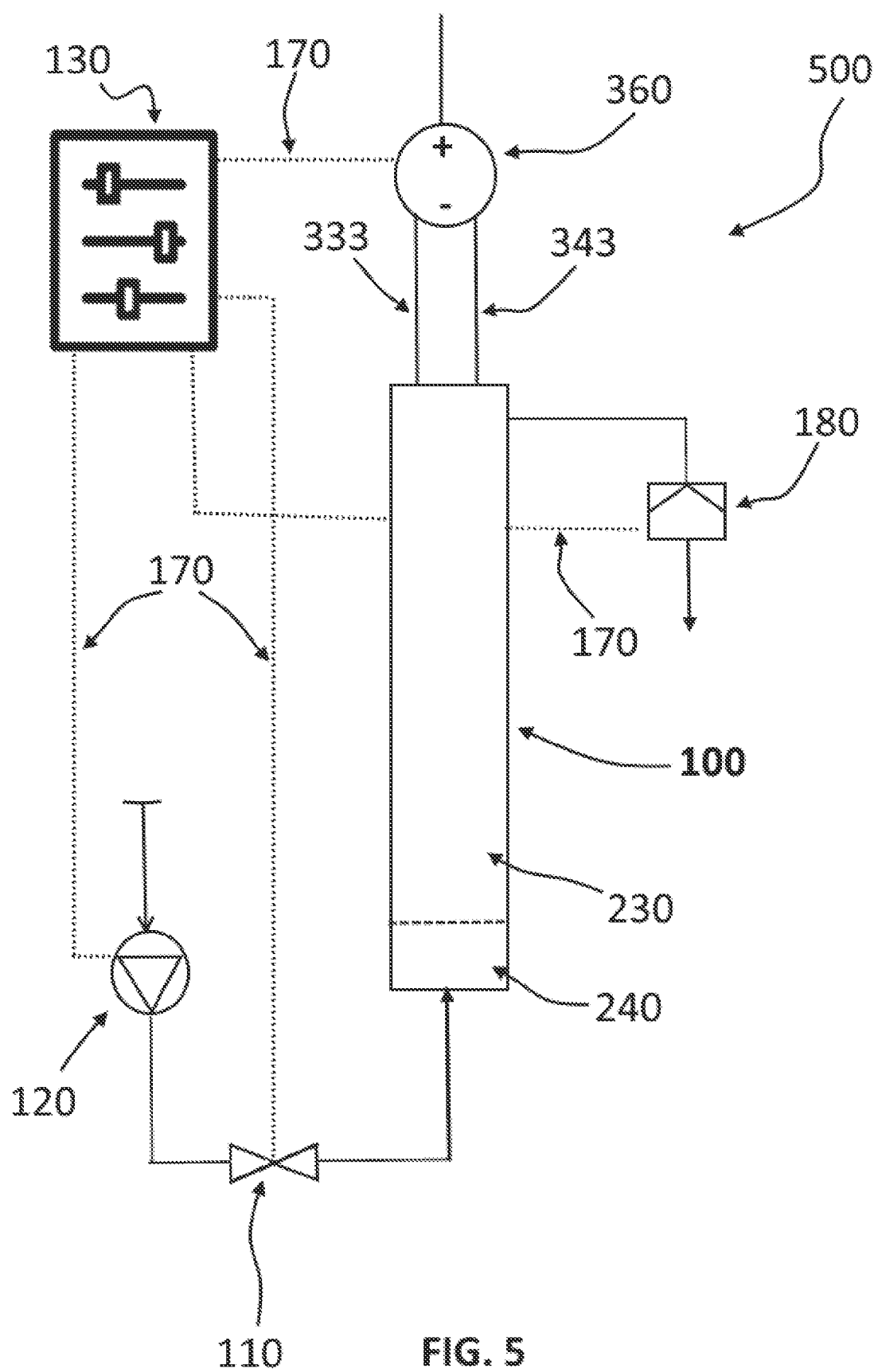
FIG. 5 is a schematic illustration of a reactor assembly with one reactor according to a preferred embodiment.

According to a preferred embodiment, the enclosure (200) of the reactor may define an electrolysation chamber (230), such as the one schematized on FIG. 5, extending from the open end of the enclosure and configured for containing the electrodes; and a flow dispersion chamber (240), also schematized on FIG. 5, located below the electrolysation chamber adjacent the closed end for receiving the wastewater from the inlet connected to the pump.

According to a preferred embodiment, the reactors as disclosed herein may further comprises a temperature control unit (260), such as the one visible on FIG. 3, for controlling a temperature inside the electrolytic reactor. Preferably, the temperature inside the electrolytic reactor may be maintained at a temperature not superior to 55° C.

As aforesaid, the 2N electrodes of the reactor are preferably dimensionally stable electrodes, such as titanium electrodes covered by a conductive layer of iridium dioxide or platinum electrodes.

As aforesaid, the reactors as disclosed herein are preferably used for the treatment of wastewater, more preferably comprising emerging contaminants, such as, but not limited to chemical residue of medicaments and/or perfluoroalkyl and polyfluoroalkyl substances (PFAS). The reactor as disclosed herein is configured to generate the adequate current density in the electrodes for the electro-oxidation of the molecules present in the wastewater. The electric power supply is preferably operatively connected to a control system for controlling the current distributed to the electrode assembly to a current density of about 10 mA/cm$^2$ to about 50 mA/cm$^2$, preferably about 30 mA/cm$^2$.

Figure 6:
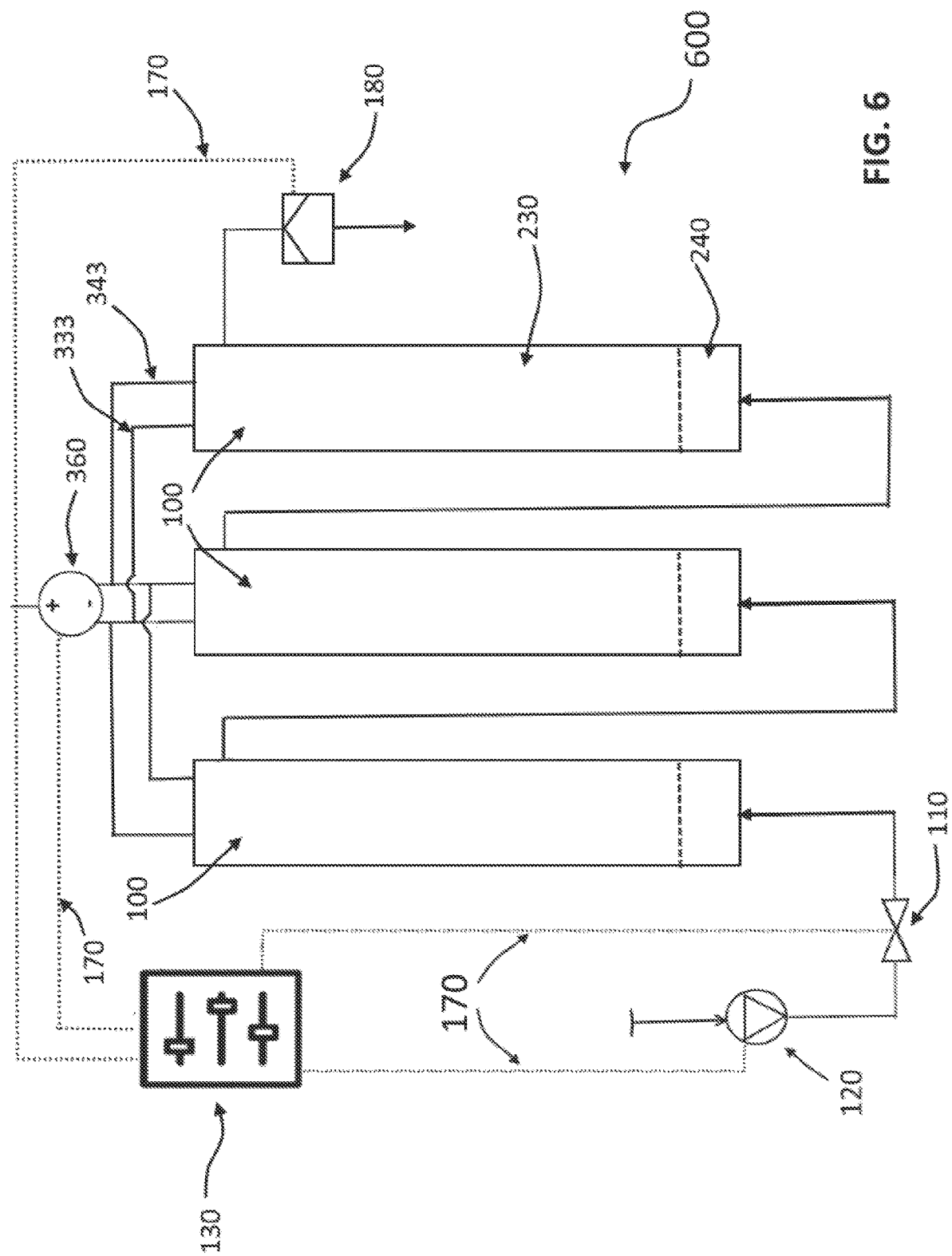
FIG. 6 is a schematic illustration of a reactor assembly with three reactors according to a preferred embodiment.

Reactor Assemblies:

According to another aspect, the present invention concerns a reactor assembly for the treatment of wastewater, preferably contaminated with emerging contaminants, comprising at least one electrolytic reactor as disclosed herein. FIG. 5 illustrates a reactor assembly (500) with one reactor (100), and FIG. 6 illustrates a reactor assembly (600) with 3 reactors (100) fluidly connected in series. The number of reactors is variable as better explained later.

The reactor assemblies (500, 600) comprise an electrical power supply (360) operatively connected to the current distribution circuits via the main wires (333, 343) of each reactor.

The reactor assemblies (500, 600) comprise a pump (120), such as a hydraulic pump, fluidly connected to the inlet of the first electrolytic reactor (100) for circulating the wastewater inside the reactor assembly. The reactors can be directly connected to any source of water to be treated (e.g. municipal water supply service, underground water, leachate from landfills, etc.).

According to a preferred embodiment, the reactor assemblies (500, 600) may further comprise a control module for modulating a flow rate of the wastewater circulating in the reactor and/or controlling a retention time of the wastewater inside the enclosure. Preferably, the control module comprises a modulating valve (110) fluidly connected to the hydraulic pump (120), both the valve and the pump being preferably operatively connected to a control panel (130) for modulating the flow rate and/or retention time in the reactor(s).

The reactor assemblies may further comprise a filtering module (180) fluidly connected to the outlet (226) of the last electrolytic reactor for filtering the wastewater once treated in the electrolytic reactor(s) (100). Preferably, the filtering module comprises a filter comprising activated carbon as filtering agent. More preferably, the activated carbon is a granulated activated carbon. Alternatively, the filter may comprise a filtering membrane or the like.

As illustrated on FIG. 6, the reactor assembly may comprise two or more electrolytic reactors (100) fluidly connected in series, the inlet of a first reactor being fluidly connected to the pump (120), and the outlet of a last reactor being fluidly connected to the filtering module (180).

The control panel (130) may also be operatively connected to the electric power supply (360) for controlling the current density. The connections (170) between the control panel and the different elements of the assembly (pump, valve, filter, etc.) can be a wire connection or a Wi-Fi or Bluetooth™ connections. The control panel can be further remotely controlled via an application on a smart device.

Decontamination Process:

Another aspect of the present invention is directed to a process for decontaminating wastewater contaminated with emerging contaminants, such as chemical residue of medicaments and/or perfluoroalkyl and polyfluoroalkyl substances (PFAS).

Figure 7:
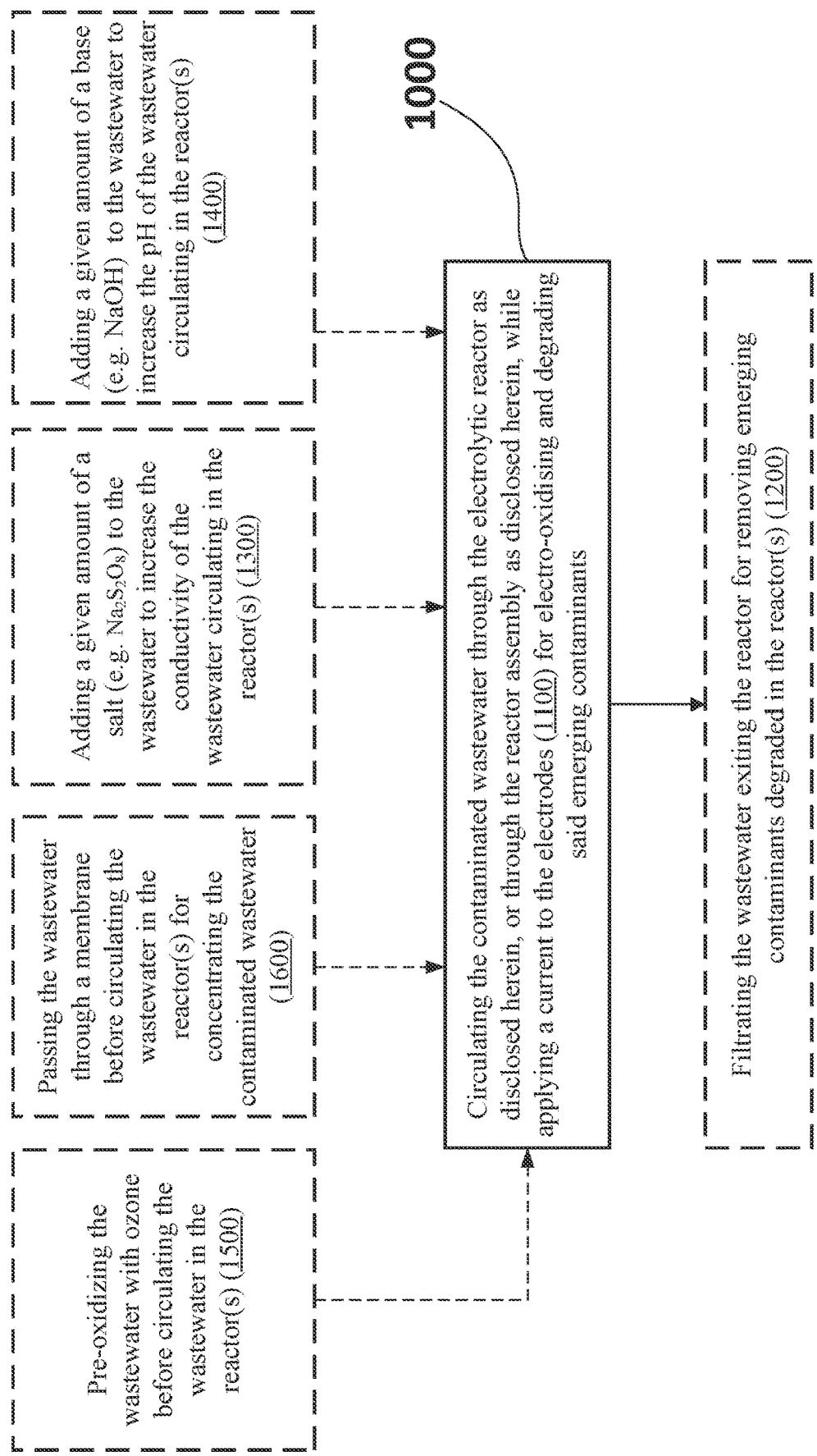
FIG. 7 is a flow chart illustrating a process for decontaminating water according to preferred embodiments.

As illustrated on FIG. 7, the process (1000) comprises the step of circulating the contaminated water through the reactor(s) as disclosed herein, while applying a current to the electrodes (1100) for electro-oxidizing and degrading the molecules of contaminants.

According to a preferred embodiment, the current provided to the electrodes gives a current density from about 10 mA/cm$^2$ to about 50 mA/cm$^2$, preferably about 30 mA/cm$^2$.

According to a preferred embodiment, the process (1000) may further comprise the step of filtrating the wastewater exiting the reactor, or the last reactor of a reactor assembly (1200) for removing degraded emerging contaminants electro-oxidized in the reactor(s). As aforesaid, filtrating the water may be performed using a filter comprising for instance (granulated) activated carbon.

According to a preferred embodiment, the process (1000) may further comprise, before electro-oxidizing, pre-degrading the PFAS by pre-oxidizing the contaminated water with ozone (1500).

According to a preferred embodiment, the process may further comprise, before electro-oxidizing, passing the wastewater through a membrane (1600) before circulating the wastewater in the reactor(s) for concentrating the contaminated wastewater.

According to a preferred embodiment, the process may further comprise adding a given amount of a salt to the wastewater (1300) to increase the conductivity of the wastewater circulating in the reactor(s), in particular when the conductivity of the wastewater is insufficient to provide the required current density to destroy pollutants. Preferably, the salt comprises sodium persulfate ($Na_2S_2O_8$). The addition can be done before the electro-oxidation step or during the treatment. The reactor assembly may then further comprise a controlling probe for measuring the conductivity of the wastewater circulating in the reactor assembly. The control panel can measure the conductivity and alert for the addition of salt in the flow stream, if necessary. The addition can be performed manually or automatically.

According to a preferred embodiment, the process may further comprise the step of adding a given amount of a base to the wastewater (1400) to increase the pH of the wastewater circulating in the reactor(s). The pH is one of the elements that is preferably adjusted to control the chemical reactions and generate the desired oxidants. Preferably, the base comprises sodium hydroxide (NaOH). As for the conductivity detailed above, the addition of the base in the flow stream can be done before the electro-oxidation step or during the treatment. The reactor assembly may then further comprise a pH probe for continuously measuring the pH of the wastewater circulating in the reactor assembly. The control panel can measure the pH and alert for the addition of the base in the flow stream, if necessary. The addition can be performed manually or automatically.

Figure 8:
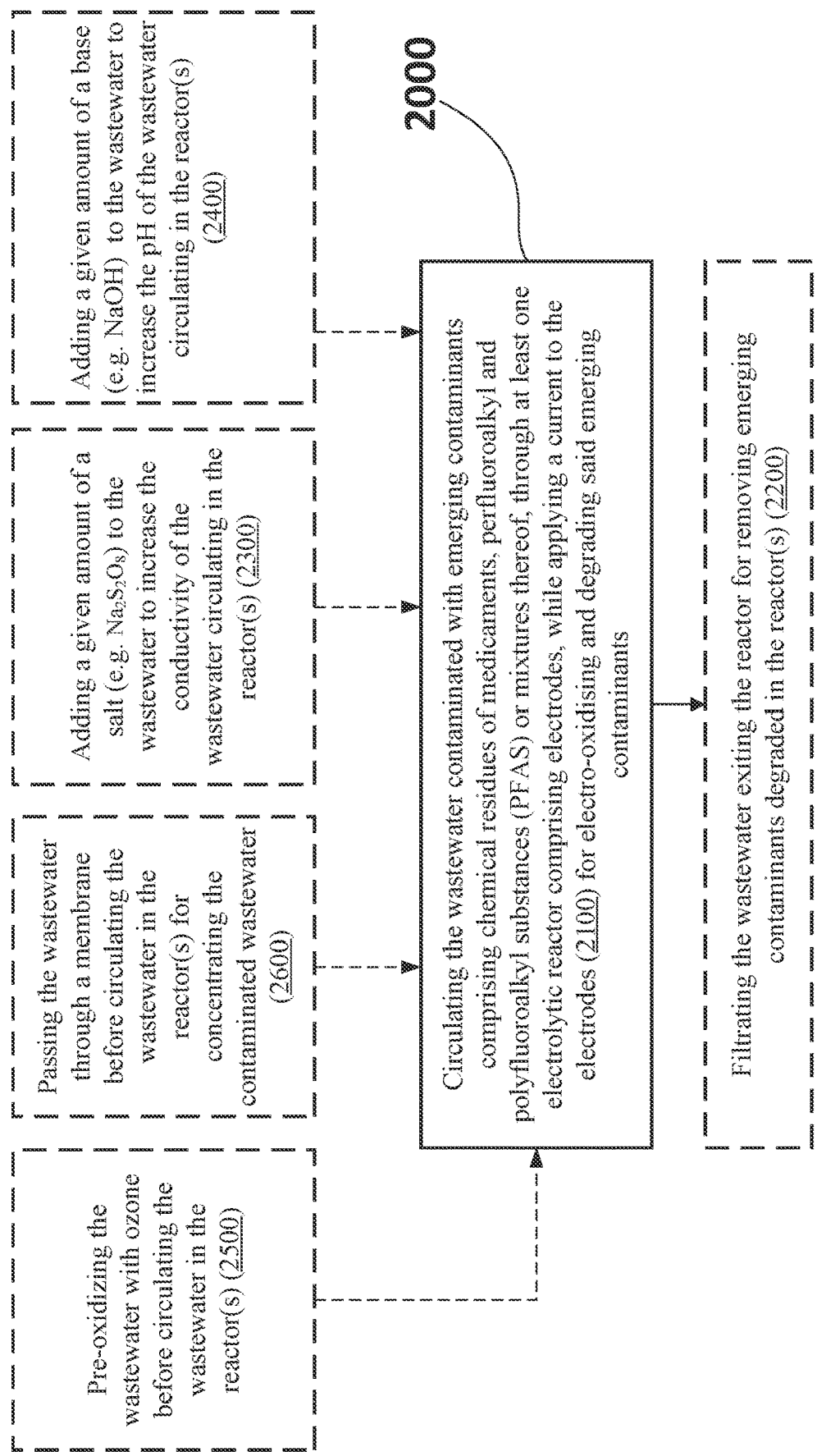
FIG. 8 is a flow chart illustrating a process for decontaminating water contaminated with emerging contaminants, according to another preferred embodiment.

Another preferred embodiment of the process according to the present invention is illustrated on FIG. 8. The process (2000) comprises the step of circulating the wastewater contaminated with emerging contaminants, such as those disclosed herein, through at least one electrolytic reactor comprising electrodes, while applying a current to the electrodes (2100), for electro-oxidizing and degrading the molecules of contaminants.

According to a preferred embodiment, the process (2000) may further comprise, before electro-oxidizing, pre-degrading the PFAS by pre-oxidizing the contaminated water with ozone (2500).

According to a preferred embodiment, the process may further comprise, before electro-oxidizing, passing the wastewater through a membrane (2600) before circulating the wastewater in the reactor(s) for concentrating the contaminated wastewater.

According to a preferred embodiment, the process may further comprise adding a given amount of a salt to the wastewater (2300) to increase the conductivity of the wastewater circulating in the reactor(s), preferably, the salt comprises sodium persulfate ($Na_2S_2O_8$). As aforesaid, the addition can be done before the electro-oxidation step or during the treatment. The reactor assembly may then further comprise a controlling probe for measuring the conductivity of the wastewater circulating in the reactor assembly. The control panel can measure the conductivity and alert for the addition of salt in the flow stream, if necessary. The addition can be performed manually or automatically.

According to a preferred embodiment, the process may further comprise the step of adding a given amount of a base to the wastewater (2400) to increase the pH of the wastewater circulating in the reactor(s). Preferably, the base comprises sodium hydroxide (NaOH). As for the conductivity detailed above, the addition of the base in the flow stream can be done before the electro-oxidation step or during the treatment. The reactor assembly may then further comprise a pH probe for continuously measuring the pH of the wastewater circulating in the reactor assembly. The control panel can measure the pH and alert for the addition of salt in the flow stream, if necessary. The addition can be performed manually or automatically.

The reactor technology of the present invention is an electrotechnology which effectively degrades PFAS or other emerging contaminants through electrochemical oxidation. The reactor as disclosed herein preferably utilizes non-sacrificial, or inert, electrodes, and is designed to generate powerful oxidants. The reactor design allows to work with compact arrays of electrodes, increasing as such the active surfaces of the electrodes. The type of the electrodes used will be based on the requirements of the application. For instance, the rod electrodes preferably comprise a core made of titanium covered by a conductive layer of iridium dioxide. Different electrodes (e.g. anodes, such as platinum (Pt) anodes) can be used depending on the contaminated water. The quantity of the oxidant generated can be adjusted via the current density and the retention time in the reactor. The oxidant make-up can include hydroxyl radicals of various forms, ozone, hydrogen peroxide, superoxide and hypochlorous acid. The system is well suited for targeted destruction and removal of organics, and recalcitrant micropollutants such as PFAS, pharmaceutical emerging contaminants, and other contaminants that are difficult to remove with conventional treatment systems. The technology of the present invention is the distinct economical and environmental choice for industrial and municipal wastewater treatment.

The reactor as disclosed herein preferably integrates nanofiltration and ozone systems. In one embodiment of the present invention, pre-treatment with membrane technology allows for the waste stream to be concentrated and destroyed, saving cost, and avoiding management of activated carbon or ion-exchange waste. In another embodiment, pre-treatment with ozone allows the PFAS to be predegraded with the reactor completing the degradation. In both embodiments, the waste stream may be decontaminated with a one-pass treatment.

In another embodiment, the step of nanofiltration with membrane technology is preferably accomplished after passing the wastewater in the reactor.

EXAMPLES

Drug Residues:

Table 2 below shows some results of the treatment of water containing different common drug residues and the efficiency of the present technology using the electro-oxidation reactor as disclosed herein.

TABLE 2

Treatment of water containing drug residues

| Drug residue | Raw water (µg/L) | SD | LQM | Treated water (µg/L) | SD | LQM |
|---|---|---|---|---|---|---|
| 1-7-dimethylxantine | 9.2 | 0.1 | 0.3 | 2.23 | 0.09 | 0.1 |
| 5-methyl-H-benzotriazol | 24.6 | 0.1 | 0.2 | 9.75 | 0.04 | 0.4 |
| Acetaminophen | 46.82 | 0.09 | 2 | <LQM | | 5 |
| Atorvastatine | 0.0393 | 0.0005 | 0.0002 | <LQM | | 0.3 |
| Atrazine | <LQM | | 0.003 | <LQM | | 0.0003 |
| Azithromycine | ND | | ND | ND | | ND |
| Caffeine | 16.7 | 0.1 | 0.2 | 5.18 | 0.06 | 0.1 |
| Carbamazepine | 0.9458 | 0.0001 | 0.004 | 0.0747 | 0.0002 | 0.002 |
| Chlorpyrifos | <LQM | | 0.007 | 0.006 | 0.006 | 0.005 |
| Clothianidine | <LQM | | 0.006 | <LQM | | 0.005 |
| Desethylatrazine | 0.004 | 0.003 | 0.002 | 0.003 | 0.005 | 0.001 |
| Desmethylvenlafaxine | 1.2 | 0.7 | 0.2 | <LQM | | 0.09 |
| Imidaclopride | 0.0229 | 0.0006 | 0.01 | 0.008 | 0.002 | 0.008 |
| Sulfamethoxazol | 0.5823 | 0.0003 | 0.007 | <LQM | | 0.01 |
| Thiamethoxame | <LQM | | 0.002 | <LQM | | 0.004 |

(with SD: Standard deviation - ND: non detectable - LQM: limit of quantification of the method):

PFAS Compounds:

Two samples of underground water were treated with the electro-oxidation reactor as disclosed herein. For each sample the raw water and the treated water were analyzed for PFAS compounds (Table 3).

TABLE 3

EO DSA

| PFAS | | Raw sample (ppb) | Treated sample (ppb) | Removal |
|---|---|---|---|---|
| Perfluorobutanoic acid | PFBA | 3.00 | 0.60 | 80.00% |
| Perfluoropentanoic acid | PFPeA | 1.70 | 1.50 | 11.76% |
| Perfluorohexanoic acid | PFHxA | 3.00 | 2.50 | 16.67% |
| Perfluorooctanoic acid | PFOA | 0.95 | 0.10* | >89.47%* |
| Perfluoropentane sulfonic acid | PFPeS | 1.70 | 1.10 | 35.29% |
| Perfluorohexane sulfonic acid | PFHxS | 20.00 | 14.00 | 30.00% |
| Perfluoroheptane sulfonic acid | PFHpS | 1.60 | 0.12 | 92.50% |
| Perfluorooctane sulfonic acid | PFOS | 110.00 | 1.80 | 98.36% |
| 6:2 Fluorotelomer sulfonic acid | 6:2-FTS | 3.40 | 1.40 | 58.82% |

*The value was below the detection limit of the analyzing method.

The remaining traces of PFAS after treatment can be removed from the flow stream by subsequent filtration according to the preferred embodiment of the process as disclosed herein. Advantageously, the filtration capacity of the filtering module is maintained for a longer period of time compared to a process in which the PFAS molecules would not be previously degraded in the electrolytic reactor.

Advantageously, the process and apparatus allow for the targeted destruction of PFAS that are difficult to remove with conventional treatment systems that leads to the formation of by-products requiring secondary steps, making a one-pass treatment difficult and/or inefficient. This, in turn, leads to high capital expenditures in comparison to the direct one-pass treatment process of wastewater as disclosed herein. The rapid start-up and shutdown with on/off capabilities, together with a fully automated process paired with remote operation on multiple platforms may create significant advantages over prior reactors. The reactors are preferably built as modular, mobile or purpose-built containerized reactors tailored to the user's needs, an integrate flexible process flowrate depending on treatment requirements (up to 5000 m³/day per skid). The reactor and process of the present invention allows continuous residual water quality monitoring for treatment effectiveness, enabling the optimal adjustment of the reactor and process parameters.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

What is claimed is:

1. A process for treating wastewater contaminated with contaminants comprising chemical residue of medicaments and/or perfluoroalkyl and polyfluoroalkyl substances (PFAS), the process comprising:
    circulating the contaminated wastewater through at least one electrolytic reactor comprising electrodes while applying a current to the electrodes, for electro-oxidizing and degrading said emerging contaminants;
    wherein each of the at least one electrolytic reactor for treating contaminated wastewater comprises:
    an enclosure comprising:
        a closed end having an inlet,
        an open end, opposite to the closed end, forming an aperture and having at least one outlet adjacent the aperture, and
        a peripheral wall extending from the closed end to the open end; and
    an electrode assembly configured to be inserted into the enclosure through the aperture and to seal the aperture to form the at least one electrolytic reactor, the electrode assembly comprising;
        a first group of N electrodes of said electrodes operatively connected to a first current distribution circuit; and
        a second group of N electrodes of said electrodes operatively connected to a second current distribution circuit;
    wherein:
        N is an integer equals to 3, 6, 9, 12, 16 or 18;
        the 2N electrodes of the first and second groups are configured to extend from the open end towards the closed end of the enclosure inside the enclosure;
        the first and second current distribution circuits are each configured to be operatively connected to an electric power supply, the N electrodes of the first group forming anodes and the N electrodes of the second group forming cathodes, and vice versa, according to a polarity of the current provided to the first and second groups of electrodes; and
        the inlet being configured to be fluidly connected to a pump for circulating the contaminated wastewater inside the enclosure from the inlet to the at least one outlet of the at least one electrolytic reactor; and
    wherein the electrode assembly comprises a crown member configured to hold the 2N electrodes and secure the current distribution circuits, the crown member being configured to seal the aperture of the enclosure once the electrodes are inserted into the enclosure; and wherein the crown member comprises:
    a plate for supporting the electrodes extending therefrom, the plate at least matching in size with the open end of the enclosure to seal the enclosure; and
    a tubular insert extending from the plate in an opposite direction than the electrodes, the tubular insert and the plate forming an inner space for securing the current distribution circuits;
    wherein the first current distribution circuit comprises a first distribution plate made of an electrically conductive material and defining a first shape, and the second current distribution circuit comprises a second distribution plate made of the electrically conductive material and defining a second shape,
    wherein each plate is configured to connect in parallel the N electrodes of its respective group, and
    wherein the first and second shapes allow the distributions plates to be inserted into the inner space of the tubular enclosure while keeping a gap therebetween to avoid electrical contact; and
    wherein the first plate has a ring shape extending along a peripheral wall of the tubular insert, and the second plate has a star shape configured in size to be located inside the first plate; and wherein the first ring shaped plate forms a number N of tips extending inwardly, each tip forming an electrical connecting point with one electrode of the same group, whereas the second star shaped plate has a number N of tips extending outwardly toward the first plate, wherein the N tips of the second plate intercalate with the N tips of the first plate along a same circumferential position, the intercalated tips being each electrically connected with one electrode of its respective group.

2. The process according to claim 1, wherein the current provides a current density to the electrodes from about 10 $mA/cm^2$ to about 50 $mA/cm^2$.

3. The process according to claim 2, wherein the current density is about 30 $mA/cm^2$.

4. The process according to claim 1, further comprising filtrating the contaminated wastewater exiting the at least one electrolytic reactor for removing degraded contaminants formed by the at least one electrolytic reactor.

5. The process of claim 4, wherein the filtrating of the contaminated wastewater exiting the at least one electrolytic reactor is performed using a filter comprising activated carbon.

6. The process according to claim 1, further comprising:
pre-oxidizing the contaminated wastewater with ozone before circulating the contaminated wastewater in the at least one electrolytic reactor.

7. The process according to claim 1, further comprising:
passing the contaminated wastewater through a membrane before circulating the contaminated wastewater in the at least one electrolytic reactor for concentrating the contaminated wastewater.

8. The process according to claim 1, further comprising:
adding a given amount of a salt to the contaminated wastewater to increase the conductivity of the contaminated wastewater circulating in the at least one electrolytic reactor.

9. The process according to claim 8, wherein the salt comprises sodium persulfate ($Na_2S_2O_8$).

10. The process according to claim 1, further comprising:
adding a given amount of a base to the contaminated wastewater to increase the pH of the contaminated wastewater circulating in the at least one electrolytic reactor.

11. The process according to claim 10, wherein the base comprises sodium hydroxide (NaOH).

12. The process according to claim 1, wherein the process is performed using two or more of said at least one electrolytic reactor fluidly connected in series, the inlet of a first of the at least one electrolytic reactors being fluidly connected to a pump, and the outlet of a last of the at least one electrolytic reactors being fluidly connected to a filtering module.

13. The process according to claim 1, wherein the 2N electrodes of each of the at least one electrolytic reactors are dimensionally stable electrodes; and wherein the 2N electrodes are 2N longitudinal rods disposed in a cylindrical manner along the peripheral wall, the N electrodes of the first group alternating with the N electrodes of the second group.

14. The process according to claim 13, wherein each of the 2N longitudinal rods comprise a core made of titanium covered by a conductive layer of iridium dioxide or platinum.

* * * * *